A. BALLOCO.
STEERING MEANS FOR AUTOMOBILES.
APPLICATION FILED APR. 16, 1907.
900,975.
Patented Oct. 13, 1908.
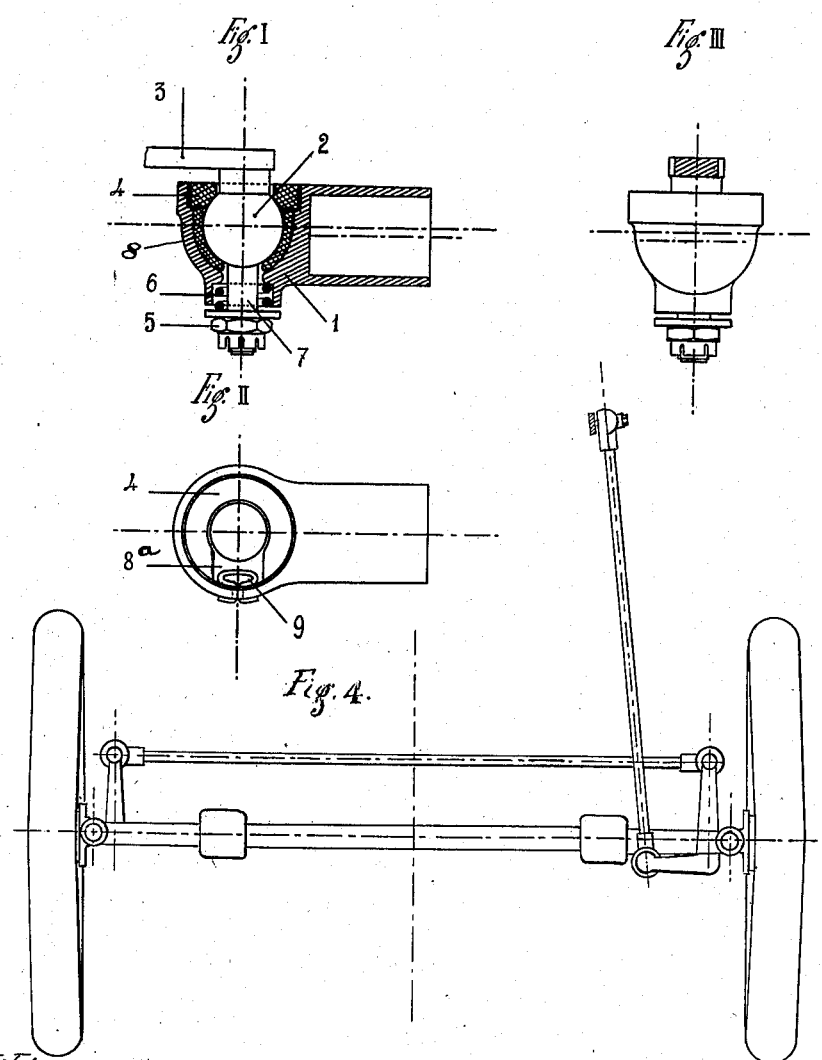
Witnesses
Inventor
Alberto Balloco
by
Attorney

UNITED STATES PATENT OFFICE.

ALBERTO BALLOCO, OF TURIN, ITALY, ASSIGNOR TO SOCIETE ANONYME "ITALA" FABRICA DI AUTOMOBILI, OF TURIN, ITALY.

STEERING MEANS FOR AUTOMOBILES.

No. 900,975.            Specification of Letters Patent.            Patented Oct. 13, 1908.

Application filed April 16, 1907. Serial No. 368,556.

*To all whom it may concern:*

Be it known that I, ALBERTO BALLOCO, a subject of the King of Italy, residing in Turin, Italy, have invented certain new and useful Improvements in Steering Means for Automobiles and the Like, of which the following is a specification.

This invention relates to certain improvements in steering means for automobiles and the like, and has for its object to provide a steering means of simple and comparatively inexpensive character wherein means is provided for lessening and automatically taking up wear and also for overcoming vibration of the parts so as to lessen the disagreeable sensation due to such vibration and which is ordinarily imparted to the hand in steering.

The invention consists in certain novel features and principles of the construction, and combinations and arrangements of the several parts of the improved steering means whereby certain important advantages are attained and the same is rendered simpler, cheaper and otherwise better adapted and more convenient for use, all as will be hereinafter fully set forth.

The novel features of the invention will be carefully defined in the claims.

In the accompanying drawings which serve to illustrate my invention—Figure 1 is a sectional view taken axially through the rotatory stem of the steering means; Fig. 2 is a plan view of the inclosing casing wherein said rotatory stem is held, Fig. 3 is a side elevation of the improved steering means, and Fig. 4 is a view showing the connections of the device.

As shown in these views, the improved steering means comprises an inclosing casing or shell 1 which may be connected with any desired part of the automobile or other vehicle to which the improved steering means is applied, and wherein is produced a vertically extended chamber, open at top and bottom of the casing and arranged to receive the rotatory stem of the steering means, the upper end of which as herein shown carries a handle 3, by means of which said stem may be turned in steering. The rotatory stem of the steering means is provided with a reduced lower end portion 7 which is extended down through an opening at the base of the shell or casing 1, and above said reduced lower end portion, the said stem has a spherical or ball-like enlargement or head 2 which is arranged to rest and turn freely upon the correspondingly formed concave bottom of a chambered bushing or lining 8, formed of hardened metal and inserted in the chamber of casing or shell 1 in position for wearing contact with the ball-like enlargement 2 of the rotatory stem. The bottom of the lining or bushing 8 is centrally apertured for the passage of the reduced lower portion 7 of the stem, and the upper part of the chamber or cavity in said bushing or lining is made in cylindrical form of sufficient diameter for free introduction of the stem therein to facilitate the assembling of the parts. Above the bushing or lining 8, there is a ring or collar 4 fitted within the upper end or mouth of the chamber or cavity in casing 1, to close the same around the upper part of the stem, and said ring or collar 4 is notched or cut out at one side as seen at 8$^a$ on the drawings, in order to permit of engaging and disengaging the ring or collar 4 upon or from the stem in assembling or taking down the parts of the device. A pin 9, set through the side of the casing serves to retain the ring or collar in position when the parts are assembled.

The lower end of the casing 1 is provided with a chamber or recess surrounding the lower reduced end of the stem 7, and in said chamber or recess is housed a spring 6, coiled around said stem with its lower end engaged upon a washer held by a nut 5 upon the screw-threaded lower end of the stem, the arrangement being such that the stem is elastically drawn down to hold the spherical enlargement or ball 2 thereof in secure engagement with the correspondingly formed surface at the base of the bushing 8, and to reduce to a minimum the vibration which is in ordinary constructions transmitted by the handle 3 to the hand of the chauffeur in the operation of the automobile. By this construction and arrangement of the shell or casing with the chambered or recessed lower end portion in position to receive and house the spring 6, the said spring is effectively inclosed and protected against becoming clogged with mud or dirt and is thereby permitted to exert its tension at all times to hold the spherical enlargement of the stem securely upon the correspondingly formed bushing or lining within the shell or casing. Furthermore, the peculiar arrangement and construction of the collar 4 at the mouth of the chamber at the upper end of the shell or casing, the entry of dirt or grit between the parts is effectively prevented, and unnecessary wear of the parts is avoided.

The improved steering means constructed according to my invention is of an extremely simple and inexpensive nature and is especially well adapted for use by reason of the reduction or neutralization of the shock and vibration resulting from the peculiar construction and arrangement of the parts, and also by reason of the automatic action of the spring in taking up wear, and it will also be obvious from the above description that the device is susceptible of some modification without material departure from the principles and spirit of the invention and for this reason I do not desire to be understood as limiting myself to the precise form and arrangement of the several parts of the device herein set forth in carrying out my invention in practice.

Having thus described my invention, what I claim and desire to secure by Letters Patent is:—

1. A device of the character described comprising a casing having chambers at opposite ends and having a reduced passage extended between said chambers, a rotatory part held to turn in the casing and having a spherical enlargement arranged within the chamber at one end of said casing and having a reduced portion extended through said reduced passage into the chamber at the opposite end of the casing, a spring coiled upon said reduced portion of the rotatory part and housed in the last-mentioned chamber of the casing, a nut on the rotatory part and engaged with said spring at the mouth of the chamber wherein said spring is housed, and an anti-friction lining arranged within the first-mentioned chamber of the casing and having its internal surface formed to correspond with the spherical enlargement of the rotatory part.

2. A device of the character described comprising a casing having a chamber open at one end thereof and provided with a reduced passage at its opposite end, a rotatory part having a spherical portion within said chamber and provided with a reduced stem extended through the reduced passage, a bushing of hardened metal held in the chamber of the casing and having a cavity formed to receive the spherical portion of the rotatory part, a spring coiled on the stem of the rotatory part below the reduced passage through which the same is extended, a nut on the stem and engaged with the spring, said rotatory part having a reduced portion extended from the mouth of the chamber of the casing, and a ring fitted in the mouth of the said chamber at said open end thereof and having a surface adapted for contact upon the spherical enlargement of the rotatory part, said ring being cut away at one side to permit it to be engaged with or disengaged from the adjacent reduced portion of the rotatory part.

In witness whereof I have hereunto signed my name this 22d day of March 1907, in the presence of two subscribing witnesses.

ALBERTO BALLOCO.

Witnesses:
SEEMOLO COSTA,
LOUIS ALLAN.